United States Patent
Lear et al.

(10) Patent No.: US 9,728,826 B2
(45) Date of Patent: Aug. 8, 2017

(54) TRACTION BATTERY THERMAL MANAGEMENT METHOD AND SYSTEM

(71) Applicant: FORD GLOBAL TECHNOLOGIES, LLC, Dearborn, MI (US)

(72) Inventors: Christopher Alan Lear, Dearborn, MI (US); Sam Revach, Ypsilanti, MI (US); Scott James Thompson, Canton, MI (US); Robert Hasse, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 14/732,042

(22) Filed: Jun. 5, 2015

(65) Prior Publication Data
US 2016/0359208 A1 Dec. 8, 2016

(51) Int. Cl.
| | |
|---|---|
| *H01M 10/6567* | (2014.01) |
| *H01M 10/625* | (2014.01) |
| *H01M 10/613* | (2014.01) |
| *H01M 10/615* | (2014.01) |
| *H01M 10/663* | (2014.01) |
| *B60K 1/04* | (2006.01) |

(52) U.S. Cl.
CPC ............ *H01M 10/625* (2015.04); *B60K 1/04* (2013.01); *H01M 10/613* (2015.04); *H01M 10/615* (2015.04); *H01M 10/6567* (2015.04); *H01M 10/663* (2015.04); *H01M 2220/20* (2013.01)

(58) Field of Classification Search
CPC .............. F28D 15/00; H01M 10/6567; H01M 2220/20
USPC .................................................. 307/9.1, 10.7
See application file for complete search history.

(56) References Cited

U.S. PATENT DOCUMENTS

| | | | |
|---|---|---|---|
| 5,730,237 A | 3/1998 | Matsuki et al. | |
| 8,601,811 B2 | 12/2013 | Pursifull et al. | |
| 8,851,055 B2 | 10/2014 | Martini et al. | |
| 2006/0112701 A1* | 6/2006 | Dykstra | F25B 49/02 62/132 |
| 2010/0012295 A1* | 1/2010 | Nemesh | B60H 1/00278 165/104.19 |
| 2011/0206951 A1 | 8/2011 | Ford et al. | |
| 2013/0280561 A1* | 10/2013 | Tolkacz | B60W 10/26 429/50 |

* cited by examiner

*Primary Examiner* — Robert Deberadinis
(74) *Attorney, Agent, or Firm* — Carlson, Gaskey & Olds, P.C.

(57) ABSTRACT

An exemplary method includes circulating a fluid through a heat exchanger and a battery pack when the battery pack requires cooling, and circulating the fluid through an exhaust gas heat recovery device and the battery pack when the battery pack requires heating. An exemplary system includes a battery pack, a heat exchanger, an exhaust gas heat recovery device, and a fluid valve moveable to a cooling position that permits a fluid to circulate between the heat exchanger and the battery pack and a heating position that permits the fluid to circulate between the exhaust gas heat recovery device and the battery pack.

19 Claims, 2 Drawing Sheets

TRACTION BATTERY THERMAL MANAGEMENT METHOD AND SYSTEM

TECHNICAL FIELD

This disclosure relates to managing thermal energy levels of a traction battery and, more particularly, to selective heating of the traction battery using an exhaust gas heat recovery device.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Traction batteries of electrified vehicles have an optimal operating temperature range. Operating the traction battery within the optimal operating temperature range can, among other things, improve the operational efficiency of the traction battery. Heating or cooling the traction battery can be required to bring the traction battery within the optimal operating temperature range.

SUMMARY

A method according to an exemplary aspect of the present disclosure includes, among other things, circulating a fluid through a heat exchanger and a battery pack when the battery pack requires cooling, and circulating the fluid through an exhaust gas heat recovery device and the battery pack when the battery pack requires heating.

In a further non-limiting embodiment of the foregoing method, the method includes directing an exhaust gas from the engine through the exhaust gas heat recovery device when the battery pack requires heating, and bypassing the exhaust gas from the engine around the exhaust gas heat recovery device when the battery pack requires cooling.

In a further non-limiting embodiment of any of the foregoing methods, the method includes circulating the fluid through the exhaust gas heat recovery device when the battery pack requires cooling.

In a further non-limiting embodiment of any of the foregoing methods, the method further includes bypassing the fluid around the heat exchanger when the battery pack requires heating.

In a further non-limiting embodiment of any of the foregoing methods, the method includes powering a drive wheel of an electrified vehicle using power from the battery pack.

In a further non-limiting embodiment of any of the foregoing methods, the method includes removing thermal energy from the fluid at the heat exchanger when the battery pack requires cooling.

In a further non-limiting embodiment of any of the foregoing methods, the method includes adding thermal energy to the fluid at the exhaust gas heat recovery device when the battery pack requires heating.

In a further non-limiting embodiment of any of the foregoing methods, the method includes heating the exhaust gas heat recovery device with an exhaust gas from an internal combustion engine.

In a further non-limiting embodiment of any of the foregoing methods, the fluid is a liquid.

In a further non-limiting embodiment of any of the foregoing methods, the heat exchanger is a radiator.

A system according to an exemplary aspect of the present disclosure includes, among other things, a battery pack, a heat exchanger, an exhaust gas heat recovery device, and a fluid valve moveable to a cooling position that permits a fluid to circulate between the heat exchanger and the battery pack and a heating position that permits the fluid to circulate between the exhaust gas heat recovery device and the battery pack.

In a further non-limiting embodiment of the foregoing system, the assembly includes a gas valve moveable to a recovery position that directs an exhaust gas to flow through the exhaust gas heat recovery device when the fluid valve is in the heating position and a bypass position that directs the exhaust gas to bypass around the exhaust gas heat recovery device when the fluid valve is in the cooling position.

In a further non-limiting embodiment of any of the foregoing systems, the flow moves through the exhaust gas heat recovery device when the fluid valve is in the cooling position.

In a further non-limiting embodiment of any of the foregoing systems, the flow bypasses around the heat exchanger when the fluid valve is in the heating position.

In a further non-limiting embodiment of any of the foregoing systems, the battery pack is a traction battery pack that powers a drive wheel of an electrified vehicle.

In a further non-limiting embodiment of any of the foregoing systems, the assembly includes an internal combustion engine that provide the exhaust gas.

In a further non-limiting embodiment of any of the foregoing systems, the heat exchanger is configured to communicate thermal energy from the fluid when the fluid valve is in the cooling position.

In a further non-limiting embodiment of any of the foregoing systems, the exhaust gas heat recovery device is configured to communicate thermal energy to the fluid when the fluid valve is in the heating position.

In a further non-limiting embodiment of any of the foregoing systems, the heat exchanger is a radiator.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to heating and cooling a battery pack of an electrified vehicle. During the heating, an exhaust gas heat recovery ("EGHR") device heats a fluid.

Heated fluid from the EGHR devices moves through the battery pack to heat the battery pack. During the cooling, the same fluid moves through the battery pack to cool the battery pack.

Figure 1:
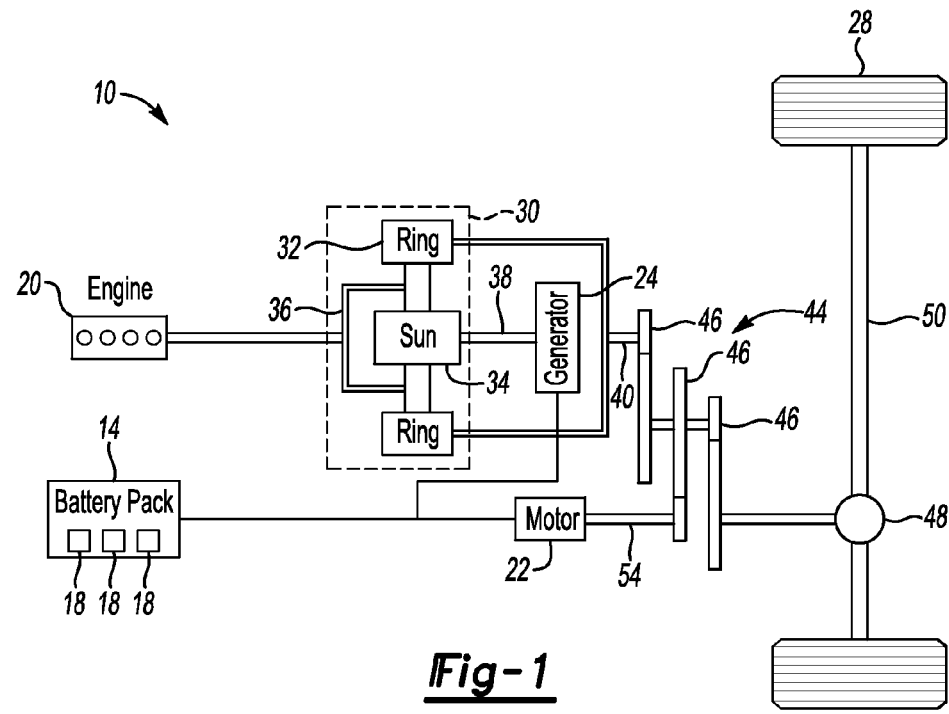
FIG. 1 schematically illustrates an example powertrain of a hybrid electric vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

The arrays 18 of the battery pack 14 include battery cells. Operating the battery cells and other portions of the battery pack 14 within an optimal temperature range can, among other things, facilitate efficient operation. The optimal temperature range for some types of battery packs 14 can be from 20 to 40 degrees Celsius, for example.

Figure 2:
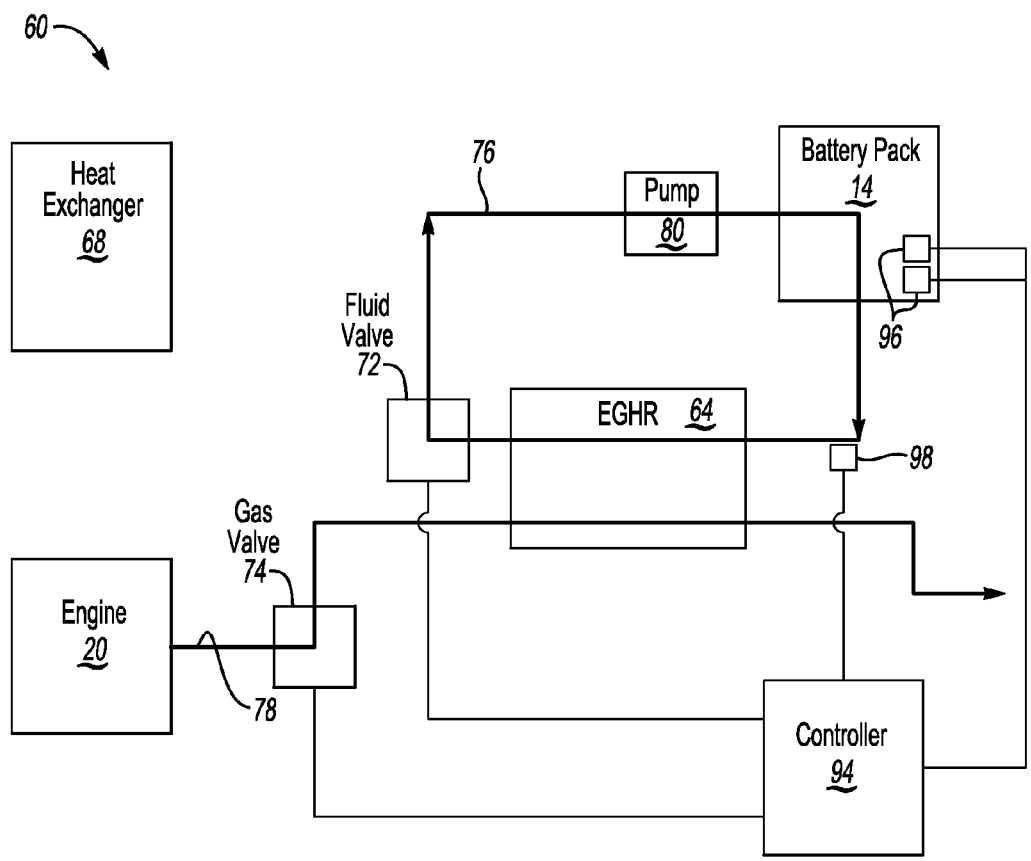
FIG. 2 schematically illustrates a thermal management system when heating a battery pack of the powertrain of FIG. 1.
Figure 3:
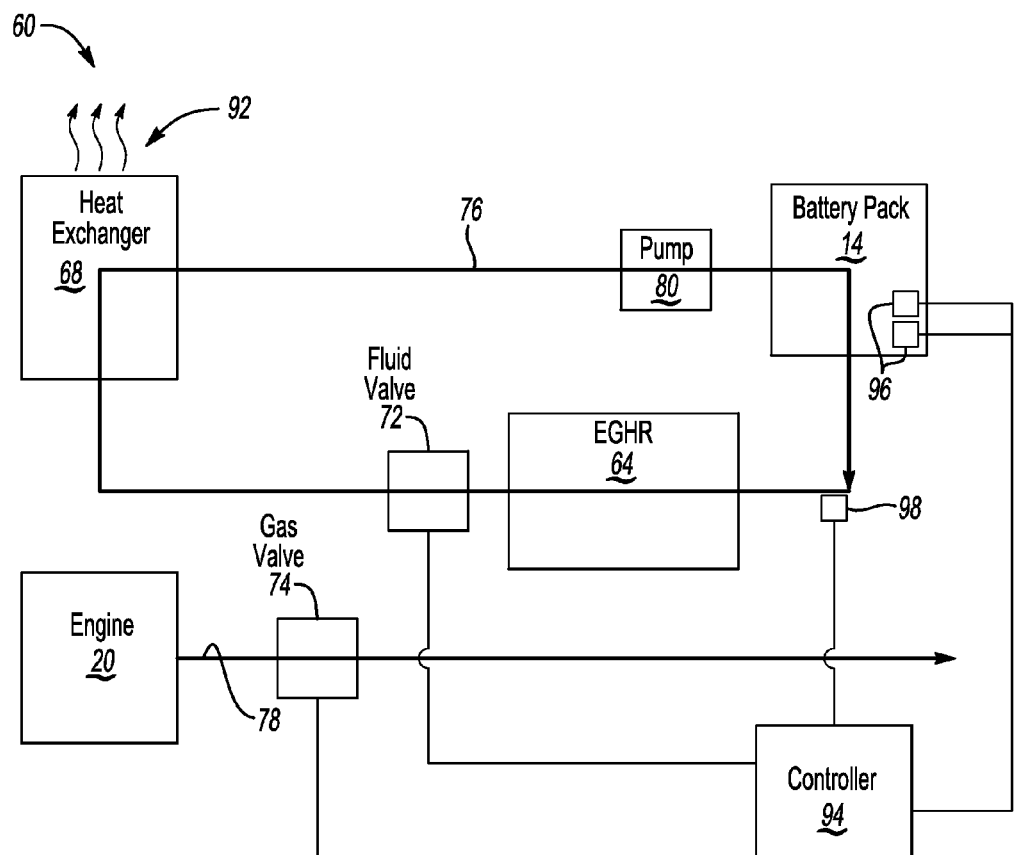
FIG. 3 schematically illustrates the thermal management system of FIG. 2 when cooling the battery pack of the powertrain of FIG. 1.

Referring now to FIGS. 2 and 3 with continuing reference to FIG. 1, an example thermal management system 60 selectively heats or cools the battery pack 14 to bring the battery pack 14 to be within, or closer to, the optimal temperature range.

When the temperatures of the battery cells, or another portion of the battery pack 14, are below an optimal temperature range, the system 60 can add thermal energy to the battery pack 14. When the temperature of the battery cells within the battery pack 14 are above an optimal temperature range, the system 60 can remove thermal energy from the battery pack 14. The system 60 thus selectively heats or cools the battery pack 14. The system 60 can heat or cool portions of the battery pack 14, such as battery cells of selected arrays 18, rather than the entire battery pack 14.

In this example, the system 60 includes the battery pack 14, an EGHR device 64, a heat exchanger 68, a fluid valve 72, a gas valve 74, an adjustable fluid path 76, and an adjustable exhaust gas flow path 78. A pump 80 can be used to move a fluid along the fluid path 76. The fluid is a liquid coolant in this example. In another example, the fluid could be a gas, such as air.

In this example, the fluid valve 72 can be actuated back and forth between a heating position and a cooling position. The fluid path 76 adjusts depending on the positioning of the fluid valve 72. FIG. 2 illustrates an example of the fluid path 76 when the fluid valve 72 is in the heating position. FIG. 3 illustrates an example of the fluid path 76 when the fluid valve 72 is in the cooling position.

When the fluid valve 72 is in the heating position, fluid moves along the fluid path 76 and carries thermal energy to the battery pack 14 to provide heating. When the fluid valve 72 is in the cooling position, fluid moves along the fluid path 76 and carries thermal energy from the battery pack 14 to provide cooling.

When the fluid valve 72 is in the heating position, the fluid path 76 extends from the battery pack 14, to the EGHR device 64, to the fluid valve 72, and then back to the battery pack 14. The fluid path 76 thus bypasses around the heat exchanger 68 when the fluid valve 72 is in the heating position.

The gas valve 74 is adjustable between a recovery position that directs exhaust gas to flow through the EGHR device 64 and a bypass position that directs the exhaust gas to bypass around the exhaust gas heat recovery device.

When the fluid valve 72 is in the heating position, the gas valve 74 is adjusted to the recovery position to cause the exhaust gas flow path 78 to extend through the EGHR device 64. Thus, when the fluid valve 72 is in the heating position, the EGHR device 64 receives a flow of exhaust gas from the engine 20. When the exhaust gas is moving through the EGHR device 64, the fluid moving along the fluid path 76 that is exiting the EGHR device 64 is heated relative to the fluid entering the EGHR device 64. The exhaust gas heats the fluid within the EGHR device 64.

The EGHR device 64 is a type of heat exchanger that transfers thermal energy from the exhaust gas to the fluid within the fluid path 76. The EGHR device 64 recovers waste heat as most of the thermal energy within the exhaust gas is expelled to ambient if not moved through the EGHR device 64.

Several types of heat transfer could be used by the EGHR device 64 to transfer heat to the fluid within the fluid path including, but not limited to, conduction, convection, advection, and radiation.

The fluid within the fluid path 76 circulates between the battery pack 14 and the EGHR device such that the fluid carries thermal energy from the EGHR device 64 to the battery pack 14 when the fluid valve 72 is in the heating position. Because the fluid valve 72 in the heating position bypasses the fluid from the EGHR device 64 around the heat exchanger 68, the fluid that has been heated within the EGHR device 64 will not cool due to communication through the heat exchanger 68.

When the fluid valve 72 is in the cooling position, the fluid path 76 extends from the battery pack 14, to the EGHR device 64, to the fluid valve 72, to the heat exchanger 68, and then back to the battery pack 14. The fluid within the fluid path 76 circulates between the battery pack 14 and the heat exchanger 68 to carry thermal energy from the battery pack 14 to the heat exchanger 68 when the fluid valve 72 is in the cooling position.

The heat exchanger 68 is a type of heat exchanger that removes thermal energy from fluid moving along the fluid path within the heat exchanger 68. The heat exchanger 68 is a radiator in this example. Within the heat exchanger 68, the fluid moving along the fluid path 76 can be cooled by surrounding air. Thermal energy from the fluid moves to ambient at 92. The fluid moving along the fluid path 76 that is exiting the heat exchanger 68 is thus cooled relative to the fluid entering the heat exchanger 68.

Several types of heat transfer could be used by the heat exchanger 68 to transfer heat from the fluid within the fluid path including, but not limited to, conduction, convection, advection, and radiation.

When the fluid valve 72 is in the cooling position, the gas valve 74 is adjusted to the bypass position to cause the exhaust gas to bypass around the EGHR device 64. Bypassing the exhaust gas around the EGHR device 64 ensures that thermal energy is not added to the fluid within the fluid path 76 when cooling the battery pack 14 is desired.

The gas valve 74 can adjust the exhaust gas flow path to direct the exhaust gas to the EGHR device 64, to bypass the exhaust gas around the EGHR device 64, or some combination of these.

The system 60 can include a controller 94 that is operably coupled to one or more temperature sensors 96 within the battery pack 14, the fluid valve 72, and the gas valve 74. The controller 94 can be further operably coupled to temperature sensors outside the battery pack 14, such as temperature sensors 98 that monitor temperatures of the fluid moving along the fluid path 76.

The controller 94 is configured to move the fluid valve 72 between the heating and cooling positions. The controller 94 can move the fluid valve 72 in response to temperature measurements from the sensors 96, the sensors 98, or in response to some other input.

In some examples, during startup in cold ambient conditions, the controller 94 moves the fluid valve 72 to the heating position and moves the gas valve 74 to a position that directs flow through the EGHR device 64. This positioning of the fluid valve 72 and the gas valve 74 causes fluid in the fluid path 76 to heat areas of the battery pack 14, which can raise or maintain temperatures of the battery pack 14 closer to the desired operating temperature range.

After the temperatures of the battery pack 14 has increased, the controller 94 can then move the fluid valve 72 the cooling position and the gas valve 74 to a position that bypasses exhaust flow around the EGHR device 64. This positioning of the fluid valve 72 and the gas valve 74 causes fluid in the fluid path 76 to cool areas of the battery pack 14, which can reduce or maintain temperatures of the battery pack 14 closer to the desired operating temperature range.

The controller 94 can be a portion of a battery electronic control module (BECM) containing circuitry utilized for retrieving data from the sensors 96, 98, and for controlling the positioning of the fluid valve 72 and the gas valve 74. The controller 94 could be outside the BECM in other examples.

The fluid valve 72 is a valve that can be actuated to regulate the fluid within the fluid path 76. The fluid valve 72 is responsive to signals from the controller 94. In some examples, the controller 94 is eliminated and the fluid valve 72 is responsive instead to signals from the temperature sensors 96, 98. The fluid valve 72 could be a ball valve, gate valve, butterfly valve, or some other type of valve suitable for regulating fluid flow.

In some examples, the fluid valve 72 can be adjusted to heating positions or cooling positions where some fluid moving along the fluid path 76 bypasses the heat exchanger 68 and some fluid moving along the fluid path moves through the heat exchanger 68. Such positions may be desired if less cooling or less heating is desired.

The gas valve 74 is a valve that can be actuated to regulate the flow of exhaust gas from the engine 20. The gas valve 74 is responsive to signals from the controller 94. In some examples, the controller 94 is eliminated and the gas valve 74 is responsive instead to signals from the temperature sensors 96, 98. The gas valve 74 could be a ball valve, gate valve, butterfly valve, or some other type of valve suitable for regulating fluid flow.

In some examples, the gas valve 74 can be adjusted to positions where some flow is direct through the EGHR device 64 and some flow is bypassed around the EGHR device 64. Such positions may be desired if reduced heating of fluid moving along the fluid path 76 within the EGHR device 64 is desired.

Features of the disclosed examples include heating battery cells and other portions of a battery pack 14 using thermal energy from the exhaust gas and without requiring a separate heater. Additional heating elements could be added to the system 60 if further heating is desired.

Another feature of the system 60 is improved fuel economy in cold ambient temperatures due to the battery cells of the battery pack 14 reaching an optimal temperature range more quickly due to thermal energy from the exhaust gas.

The system 60 is particularly applicable to single motor battery limited modified hybrid transmission electrified vehicle architectures where full battery power discharge limits can be required for optimal start-stop operation and fuel efficiency.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
   circulating a fluid through a heat exchanger and a battery pack when the battery pack requires cooling; and
   circulating the fluid through an EGHR device and the battery pack when the battery pack requires heating.

2. The method of claim 1, further comprising directing an exhaust gas from an engine through the EGHR device when the battery pack requires heating, and bypassing the exhaust gas from the engine around the EGHR device when the battery pack requires cooling.

3. The method of claim 2, further comprising circulating the fluid through the EGHR device when the battery pack requires cooling.

4. The method of claim 2, further comprising bypassing the fluid around the heat exchanger when the battery pack requires heating.

5. The method of claim 1, further comprising powering a drive wheel of an electrified vehicle using power from the battery pack.

6. The method of claim 1, further comprising removing thermal energy from the fluid at the heat exchanger when the battery pack requires cooling.

7. The method of claim 1, further comprising adding thermal energy to the fluid at the EGHR device when the battery pack requires heating.

8. The method of claim 1, further comprising heating the EGHR device with an exhaust gas from an internal combustion engine.

9. The method of claim 1, wherein the fluid is a liquid.

10. The method of claim 1, wherein the heat exchanger is a radiator.

11. An system, comprising
a battery pack;
a heat exchanger;
an EGHR device; and
a fluid valve moveable to a cooling position that permits a fluid to circulate between the heat exchanger and the battery pack and a heating position that permits the fluid to circulate between the EGHR device and the battery pack.

12. The system of claim 11, further comprising a gas valve moveable to a recovery position that directs an exhaust gas to flow through the EGHR device when the fluid valve is in the heating position and a bypass position that directs the exhaust gas to bypass around the EGHR device when the fluid valve is in the cooling position.

13. The system of claim 11, wherein the flow moves through the EGHR device when the fluid valve is in the cooling position.

14. The system of claim 11, wherein the flow bypasses around the heat exchanger when the fluid valve is in the heating position.

15. The system of claim 11, wherein the battery pack is a traction battery pack that powers a drive wheel of an electrified vehicle.

16. The system of claim 11, further comprising an internal combustion engine that provide the exhaust gas.

17. The system of claim 11, wherein the heat exchanger is configured to communicate thermal energy from the fluid when the fluid valve is in the cooling position.

18. The system of claim 11, wherein the EGHR device is configured to communicate thermal energy to the fluid when the fluid valve is in the heating position.

19. The system of claim 11, wherein the heat exchanger is a radiator.

* * * * *

UNITED STATES PATENT AND TRADEMARK OFFICE
CERTIFICATE OF CORRECTION

PATENT NO. : 9,728,826 B2
APPLICATION NO. : 14/732042
DATED : August 8, 2017
INVENTOR(S) : Christopher Alan Lear et al.

It is certified that error appears in the above-identified patent and that said Letters Patent is hereby corrected as shown below:

In the Claims

In Claim 11, Column 7, Line 19; before "system" replace "An" with --A--

In Claim 13, Column 8, Line 7; after "wherein" replace "the flow" with --the fluid--

In Claim 14, Column 8, Line 10; after "wherein" replace "the flow" with --the fluid--

In Claim 16, Column 8, Line 16; before "further comprising" replace "claim 11," with --claim 12,--

Signed and Sealed this
Twenty-first Day of November, 2017

Joseph Matal
*Performing the Functions and Duties of the
Under Secretary of Commerce for Intellectual Property and
Director of the United States Patent and Trademark Office*